United States Patent
Jang

(10) Patent No.: US 11,431,404 B1
(45) Date of Patent: Aug. 30, 2022

(54) APPARATUS AND METHOD FOR INTEGRATING COMMUNICATION AND SENSING FUNCTIONS IN WIRELESS COMMUNICATION SYSTEM

(71) Applicant: Kookmin University Industry Academy Cooperation Foundation, Seoul (KR)

(72) Inventor: Byung-Jun Jang, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 0 days.

(21) Appl. No.: 17/383,798

(22) Filed: Jul. 23, 2021

(30) Foreign Application Priority Data

May 31, 2021 (KR) .................. 10-2021-0070198

(51) Int. Cl.
*H04B 7/155* (2006.01)
*H04B 1/18* (2006.01)
*H01Q 21/24* (2006.01)
*H04B 7/0456* (2017.01)

(52) U.S. Cl.
CPC .......... *H04B 7/1555* (2013.01); *H01Q 21/24* (2013.01); *H04B 1/18* (2013.01); *H04B 7/0469* (2013.01)

(58) Field of Classification Search
CPC ...... H04B 1/18; H04B 7/0469; H04B 7/1555; H01Q 21/24
See application file for complete search history.

(56) References Cited

U.S. PATENT DOCUMENTS

| 10,782,390 B2 | 9/2020 | Lien et al. |
| 10,955,547 B2 | 3/2021 | Ray |
| 2009/0135044 A1* | 5/2009 | Sutphin .................. G01S 7/006 342/28 |
| 2017/0310758 A1* | 10/2017 | Davis .................... G01S 13/878 |
| 2021/0231771 A1* | 7/2021 | Bengtsson ............. H04B 7/088 |

FOREIGN PATENT DOCUMENTS

| KR | 10-2007-0110721 A | 11/2007 |
| KR | 10-2019-0134510 A | 12/2019 |

* cited by examiner

*Primary Examiner* — David B Lugo
(74) *Attorney, Agent, or Firm* — Jefferson IP Law, LLP

(57) ABSTRACT

A wireless communication system, an apparatus and a method for integrating communication and sensing functions in the wireless communication system are provided. The communication device includes a communication unit for bi-directional communication, and a radar unit for sensing. The communication unit and the radar unit may commonly include a common transmit chain which generates a transmit signal. The transmit signal may have a first polarization. The communication unit may include a communication receive chain, and if a receive signal has the first polarization in response to the transmit signal, the communication receive chain may receive the receive signal having the first polarization via the hybrid coupler and perform communication and if the receive signal corresponding to the transmit signal has second polarization different from the first polarization, a sensing receive chain of the radar unit may receive the receive signal having the second polarization perform sensing by the radar unit.

20 Claims, 12 Drawing Sheets

Communication Transceiver (TDD)

Communication Transceiver (FDD)

Radar Transceiver (Using isolator)

Radar Transceiver (Using Two Antenna)

APPARATUS AND METHOD FOR INTEGRATING COMMUNICATION AND SENSING FUNCTIONS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0070198, filed on May 31, 2021, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for integrating communication and sensing functions in the wireless communication system.

2. Description of Related Art

The disclosure is directed toward combining communication and sensing radar. In general, frequencies for car radar and communication are separated. The radar (e.g., the radar 77 GHz, the car communication 6 GHz or less) uses a high frequency because it is easy to form a narrow beam with an array antenna and distance measurement requires a broad band. Yet, since the radar requires a separate communication scheme to transmit its sensing result, there is a demand to combine the sensing radar and the communication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for integrating communication and sensing functions using polarization in a wireless communication system.

Another aspect of the disclosure is to provide an apparatus and a method for integrating communication and sensing functions by use of an in-phase quadrature (IQ) modulator in a wireless communication system.

Additional aspects will be set forth in part in the description which follows and, in part, will be apparent from the description, or may be learned by practice of the presented embodiments.

In accordance with an aspect of the disclosure, a communication device of a wireless communication system is provided. The communication device includes a communication unit configured for bi-directional communication, and a radar unit configured to sense an object, wherein the communication unit and the radar unit commonly may include a common transmit chain configured to generate a transmit signal by a first in-phase quadrature (IQ) modulator, wherein the common transmit chain may pass through a hybrid coupler and is configured to generate and transmit a transmit signal having first polarization, wherein the communication unit may include a communication receive chain, wherein if a receive signal has the first polarization in response to the transmit signal, the communication receive chain may receive the receive signal having the first polarization via the hybrid coupler and perform communication by the communication unit, and, wherein the radar unit may include a sensing receive chain, and wherein, in case that the receive signal corresponding to the transmit signal has second polarization different from the first polarization, the sensing receive chain may receive the receive signal having the second polarization via the hybrid coupler and sense the object by the radar unit.

In accordance with another aspect of the disclosure, an operating method of a communication device of a wireless communication system, a communication unit and a radar unit commonly including a common transmit chain is provided. The operating method includes generating and transmitting, at the common transmit chain, a transmit signal having first polarization via a hybrid coupler, receiving, in cast that a receive signal corresponding to the transmit signal has the first polarization, by the communication unit, the receive signal having the first polarization via the hybrid coupler and communicating based on the receive signal, in case that the receive signal corresponding to the transmit signal has second polarization different from the first polarization, receiving, at the radar unit, the receive signal having the second polarization via the hybrid coupler and performing sensing, wherein the communication unit is configured to for bi-directional communication, wherein the radar unit is configured to perform sensing of an object, and wherein the common transmit chain may be commonly used by the communication unit and the radar unit.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6A-1 illustrates a communication transceiver according to an embodiment of the disclosure;

FIG. 6A-2 illustrates the communication transceiver according to an embodiment of the disclosure;

FIG. 7A-1 illustrates a radar receiver structure according to an embodiment of the disclosure;

FIG. 7A-2 illustrates the radar receiver structure according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the disclosure to be described below, a hardware approach will be described as an example. However, since the various embodiments of the disclosure include a technology using both hardware and software, the various embodiments of the disclosure do not exclude a software-based approach.

Hereinafter, the disclosure relates to an apparatus and a method for integrating communication and sensing functions in a wireless communication system. Specifically, the disclosure describes a technique for integrating the communication and sensing functions using polarization in the wireless communication system.

Terms indicating signals, terms indicating channels, terms indicating control information, terms indicating network entities, terms indicating components of a device, which are used in the following descriptions, are for the sake of explanations. Accordingly, the disclosure is not limited to the terms to be described, and other terms having technically identical or similar meaning may be used.

Figure 1:
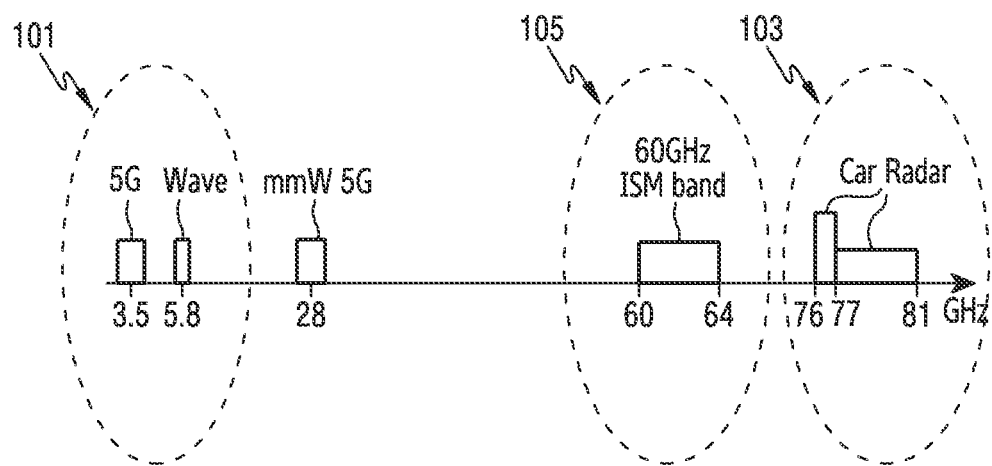
FIG. 1 illustrates use division of a communication device according to a frequency according to an embodiment of the disclosure.

FIG. 1 illustrates use division of a communication device according to a frequency according to an embodiment of the disclosure.

Referring to FIG. 1, the use division of the communication device is shown according to the frequency. A dotted line 101 indicates the frequency for the communication (i.e., vehicle to everything (V2X)). Vehicle communication generally uses a frequency band below 6 GHz. A dotted line 103 indicates the frequency for car radar. Vehicle radar generally uses a frequency band of 77 GHz. In addition, a dotted line 105 indicates a frequency band of 60 to 64 GHz of the radar for other uses (e.g., industry, science, medical, etc.). The dotted line 105 will be used as a free band for various radars.

As such, the frequencies for the car radar and the car communication are separated because the radar requires a high frequency and/or a high bandwidth. Since it is easy to generate a narrow beam with an array antenna and distance measurement requires a broad band, the radar requires a high frequency distinguished from the car communication frequency. In addition, a greater bandwidth may improve resolution in the distance measurement, and the radar demands a high frequency.

Yet, sensing using the radar needs a separate communication scheme/communication device to transmit a sensing result, and so combination of the radar and the communication is desirable.

A technique for combining the communication and the sensing may be used variously in home internet of things (IoT), entrance surveillance, and V2X. Hereafter, the disclosure explains in detail a communication device and a method for combining the communication and the sensing (i.e., the radar).

Figure 2:
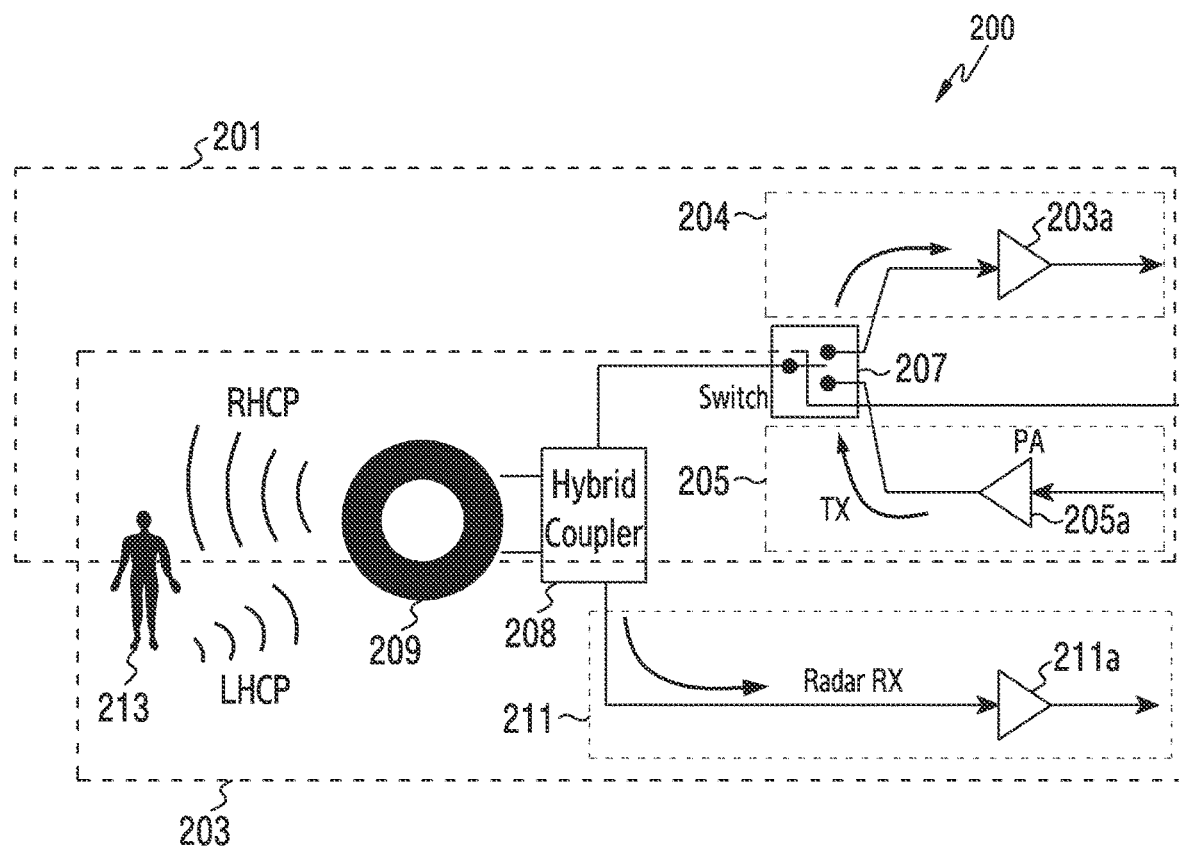
FIG. 2 illustrates a communication device which integrates communication and sensing functions using polarization in a wireless communication system according to an embodiment of the disclosure.

FIG. 2 illustrates a communication device which integrates communication and sensing functions using polarization in a wireless communication system according to an embodiment of the disclosure.

Referring to FIG. 2, a communication device 200 for integrating the communication and sensing functions is depicted. The communication device 200 may include a communication block 200 and a radar block 203.

The communication block 201 may include a communication receive chain 204 for the communication, a single pole double throw (SPDT) switch 207, a hybrid coupler 208, antenna(s) 209, and/or a common transmit chain 205 for the communication and the sensing. The communication receive chain 204 may include a low noise amplifier 203a. The common transmit chain 205 may include a power amplifier 205a. The communication receive chain 204 and/or the common transmit chain 205 may be connected to an input of the SPDT switch 207. The SPDT switch 207 may be connected to the antenna(s) 209. While the single antenna is depicted with respect to the antenna(s) 209 in FIG. 2 by way of example, a plurality of antennas may be used.

The hybrid coupler 208 may be a 90° hybrid coupler.

The antenna(s) 209 may be dual-polarized antenna(s).

The radar block 203 may include a sensing receive chain 211, and/or the SPDT switch 207, the hybrid coupler 208 and/or the antenna(s) 209 in common with the communication block 201. The communication block 201 and the radar block 203 may share the common transmit chain 205.

The sensing receive chain 211 may include a low noise amplifier 211a. The sensing receive chain 211 may be connected to the hybrid coupler 208. The hybrid coupler 208 may be connected to the antenna(s) 209.

Figure 3A:
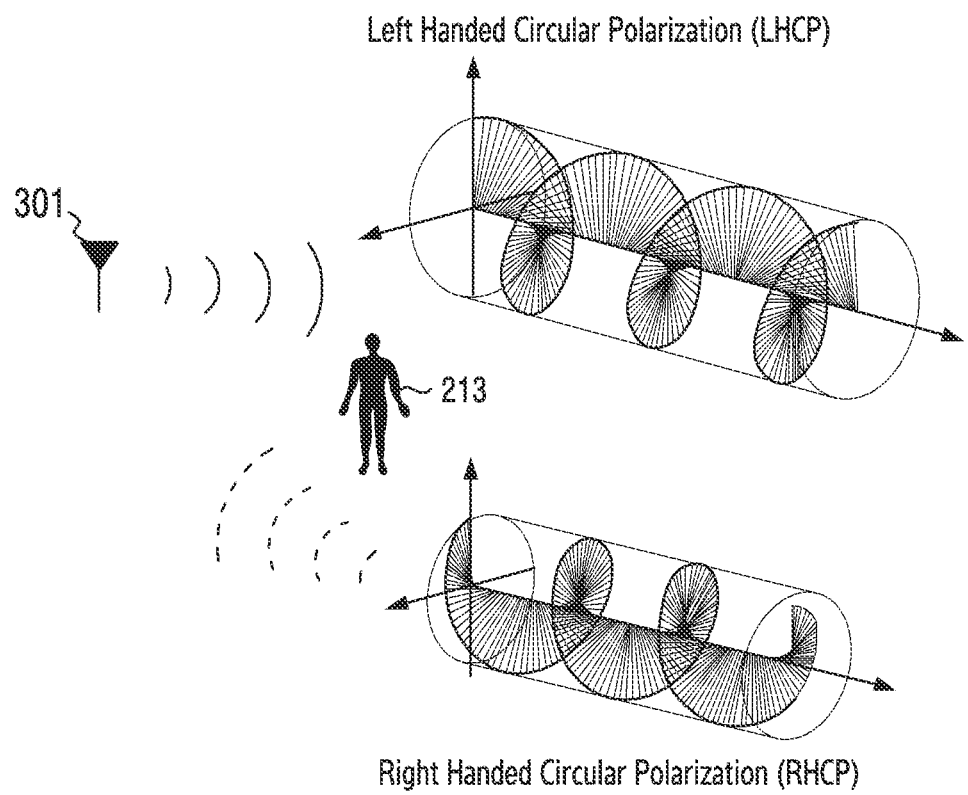
FIG. 3A illustrates a principle for dividing sensing and communication using polarization according to an embodiment of the disclosure.
Figure 3B:
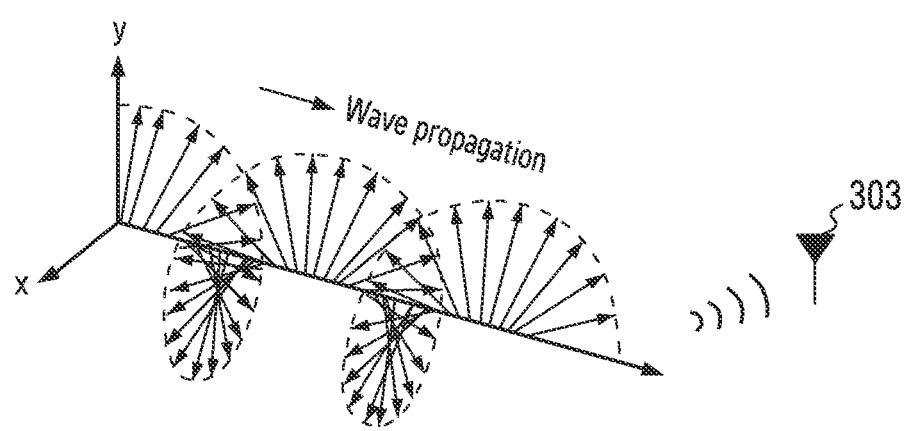
FIG. 3B illustrates a principle for dividing sensing and communication using polarization according to an embodiment of the disclosure.

Using the structure of FIG. 2, a principle of the communication device 200 which separates the sensing and the communication using the polarization is described in detail with FIGS. 3A and 3B.

FIGS. 3A and 3B illustrate a principle for dividing sensing and communication using polarization according to various embodiments of the disclosure.

FIG. 3A depicts the sensing, and FIG. 3A depicts the communication.

Referring to FIG. 3A, if a signal having first polarization is transmitted by a transceiver antenna 301, a second polarization signal having the opposite phase from the first polarization may be received according to reflective waves.

Referring to FIG. 3B, in the communication where a signal having the first polarization is transmitted by the transceiver antenna 301, the communication may be performed by receiving the signal having the first polarization at a receiver antenna 303.

The first polarization may be a left handed circular polarization (LHCP) signal or a right handed circular polarization (RHCP) signal.

If the first polarization is the LHCP, then the second polarization may be the RHCP. If the first polarization is the RHCP, then the second polarization may be the LHCP.

If the communication device 200 transmits a transmit signal having the first polarization through the common transmit chain 205, the second polarization having 180° phase difference from the first polarization may be received at the antenna(s) 209 in the sensing. In contrast, in the communication, the same signal as the first polarization may be received at the antenna(s) 209. The communication may be performed with a communication object using the signal having the second polarization. Thus, a communication signal and a sensing signal may be distinguished by separating the signals having the first polarization and the second polarization.

The first polarization signal may be an RHCP or LHCP signal.

The antenna(s) 209 may be dual-polarized antenna(s).

Figure 4A:
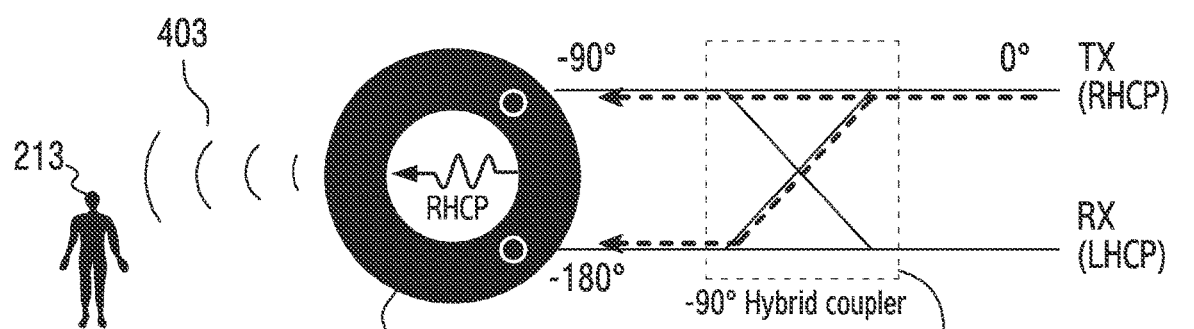
FIG. 4A illustrates operations of a hybrid coupler of a communication device 200 according to an embodiment of the disclosure.
Figure 4B:
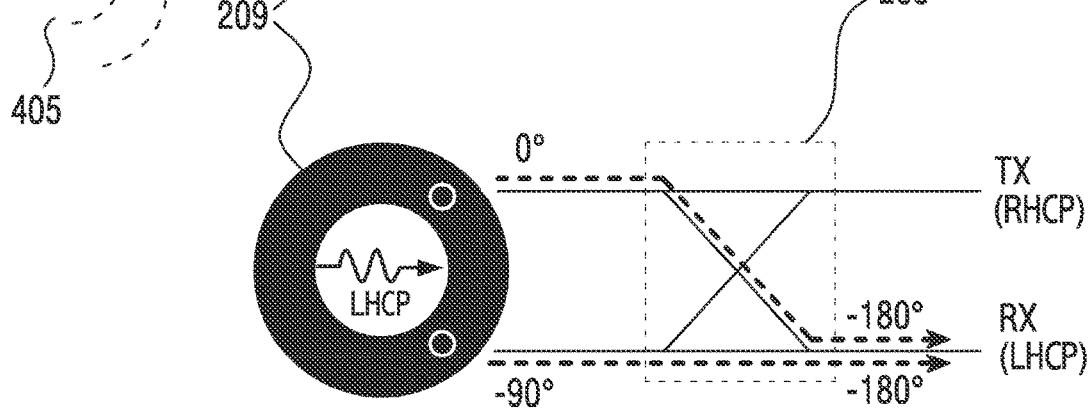
FIG. 4B illustrates operations of the hybrid coupler of the communication device 200 according to an embodiment of the disclosure.

FIGS. 4A and 4B illustrate operations of a hybrid coupler of a communication device according to various embodiments of the disclosure.

Referring to FIGS. 4A and 4B, a 90° hybrid coupler is shown by way of example, but the disclosure is not limited thereto.

In transmission and reception for the sensing, FIG. 4A depicts the signal transmission and FIG. 4B depicts the signal reception. In FIG. 4A, an RHCP transmit signal may be converted by a hybrid coupler 208 to have phase differences 90° and 180° and thus transmitted toward an object 213 by the antenna(s) 209. A signal 403 transmitted by antenna(s) 209 may be an RHCP signal.

The transmitted signal 403 may be reflected by the object 213 and received as a signal 405 having the opposite phase by the antenna(s) 209. The signal 405, which is the reflected signal, may be an LHCP signal. The signal 405 may be converted by the hybrid coupler 208 and received as a sensing (radar) signal by a sensing receive chain 211.

By operating the hybrid coupler as the described principle, the communication device 200 may separate the sensing and the communication.

Figure 5A:
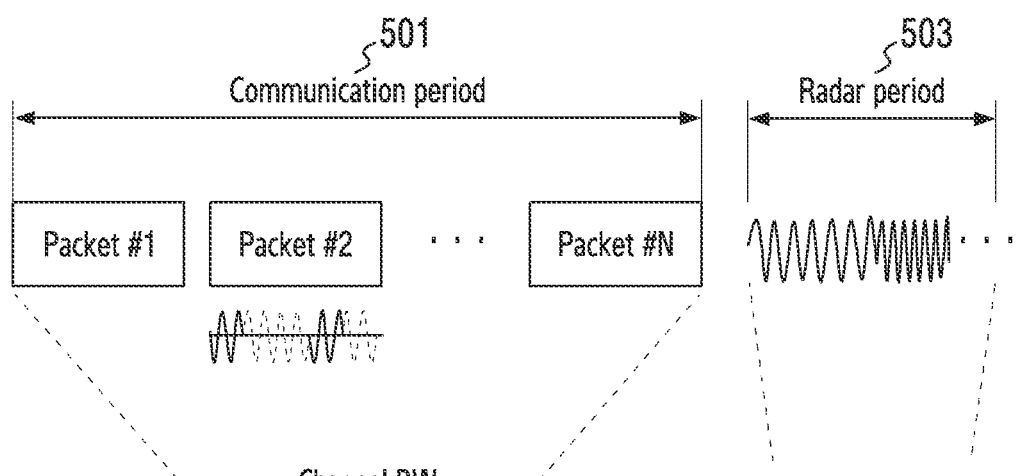
FIG. 5A illustrates a principle for integrating sensing and communication using an in-phase quadrature (IQ) modulator according to an embodiment of the disclosure.
Figure 5B:
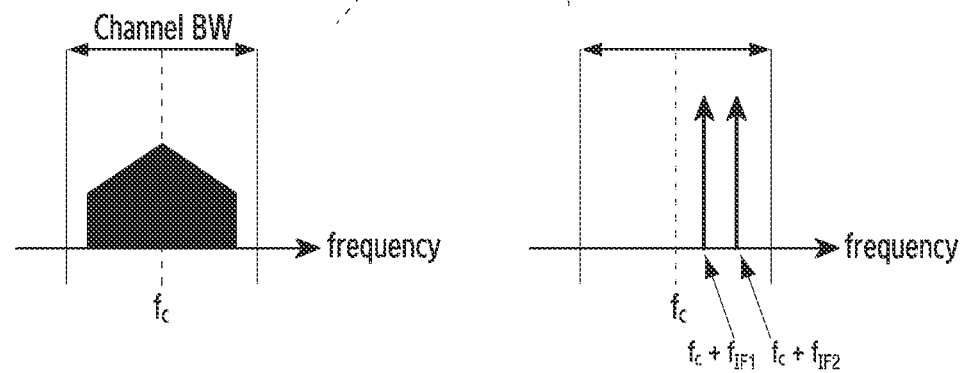
FIG. 5B illustrates the principle for integrating the sensing and the communication using the IQ modulator according to an embodiment of the disclosure.

FIGS. 5A and 5B illustrate a principle for integrating sensing and communication using an in-phase quadrature (IQ) modulator according to various embodiments of the disclosure.

Referring to FIGS. 5A and 5B, in general, frequency modulated continuous wave (FMCW) radar or pulse radar is mostly used, but the system is complex using a broadband signal and occupies a considerable frequency bandwidth. Accordingly, the radar frequency is used mostly in a millimeter wave band such as 24 GHz, 60 GHz, 77 GHz having spare bandwidth. In contrast, continuous wave (CW) Doppler radar is simple in system configuration by using only one frequency component, and may efficiently use frequency resources by using an industrial scientific and medical (ISM) frequency band such as 2.4 GHz or 5.8 GHz. However, unlike the FMCW radar, the CW doppler radar may sense only a movement of the moving object and may not obtain a distance between the radar and the object. To address this issue, multi-tone Doppler radar for using a plurality of CW frequencies and calculating the distance to the moving object by calculating a phase difference resulting from a frequency difference is suggested.

A signal may be transmitted by separating a communication period 510 and a radar period 503 in the time domain if using the IQ modulator. The communication and the radar may be divided on the time axis, by separating the communication period 501 and the radar period 503 and transmitting a CW signal with respect to the radar period 503. A specific intermediate frequency (IF) frequency may be generated with the IQ modulator in the radar period 503 to measure a distance, a velocity (movement), and/or a movement.

Figures 1, 6A:
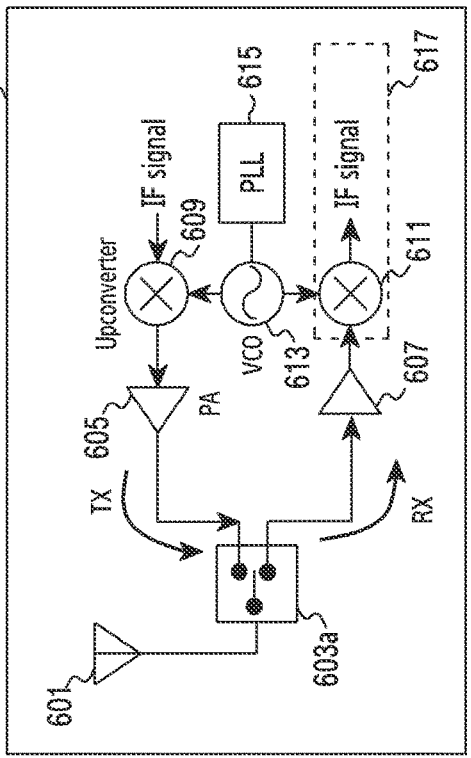
Figures 2, 6A:
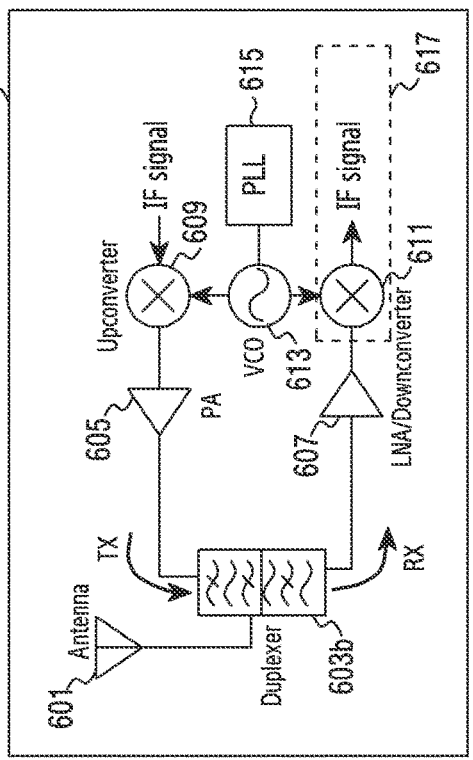
Figure 6B:
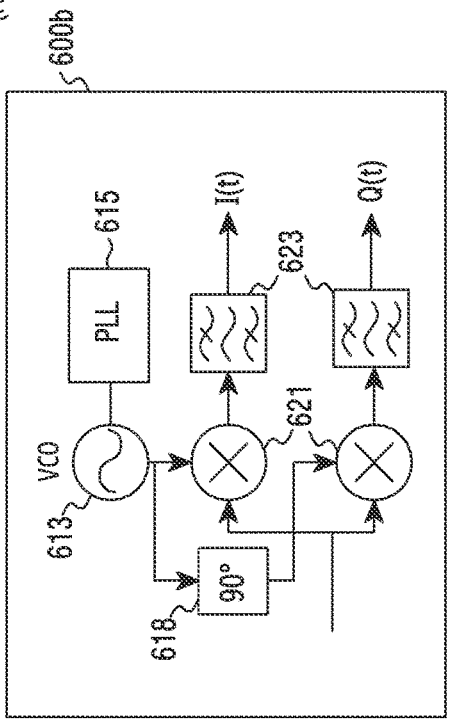
FIG. 6B illustrates the communication transceiver according to an embodiment of the disclosure.

FIGS. 6A-1, 6A-2, and 6B illustrate a communication transceiver according to various embodiments of the disclosure. FIG. 6A-1 illustrates a block diagram of a communication transceiver in a time division duplex (TDD) scheme of the related art, FIG. 6A-2 illustrates a block diagram of a communication transceiver in a frequency division duplex (FDD) scheme of the related art, and FIG. 6B illustrates modifications of FIGS. 6A-1 and 6A-2 by use of an IQ modulator.

Referring to FIG. 6A-1, a TDD transceiver 600a-1 may include an antenna 601, a duplexer 603a, a power amplifier 605, a low noise amplifier 607, an upconverter mixer 609, a downconverter mixer 611, a voltage controlled oscillator (VCO) 613, and/or a phase lock loop (PLL) 615.

The VCO 613 may oscillate a variable frequency in proportion to an input voltage, the PLL 615 may precisely vary the oscillated signal frequency, and the VCO 613 may lock the generated signal from changing according to a surrounding environment. The upconverter mixer 609 may mix the signal generated by the VCO 613 and an IF signal, and the mixed signal may pass through the power amplifier 605 and the duplexer 603a and be transmitted via the antenna 601.

A signal received via the antenna 601 may pass through the duplexer 603a and the low noise amplifier 607 and be down-converted by the downconverter mixer 611 to an IF signal with the signal generated by the VCO 613.

Referring to FIG. 6A-2, an FDD transceiver 600a-2 may include an antenna 601, a duplexer 603b, a power amplifier 605, a low noise amplifier 607, an upconverter mixer 609, a downconverter mixer 611, a VCO 613, and/or a PLL 615.

The antenna 601, the power amplifier 605, the low noise amplifier 607, the upconverter mixer 609, the downconverter mixer 611, the VCO 613, and/or the PLL 615 in FIG. 6A-2 may equal or correspond to those of FIG. 6A-1.

The duplexer 603a of FIG. 6A-1 may be a TDD duplexer in which a transmit signal and a receive signal having the same frequency alternately use the same path with a time gap. The duplexer 603b of FIG. 6A-2 may be an FDD duplexer which, to share a transmit frequency and a receive frequency with one antenna in the FDD, allows a transceiver, a receiver, and an antenna to transmit or receive a signal at the same time without collisions.

Referring to FIG. 6B part of a communication device 600b including the IQ modulator is shown, which may replace the element 617 of FIGS. 6A-1 and 6A-2.

The communication device 600b including the IQ modulator may include a VCO 613, a PPL 615, a phase shifter 618, a mixer 621, and/or a filter 623. The transmitter and the receiver of the communication generally uses direct conversion through this structure, the IQ modulator may replace it using a I signal and a Q signal. Specifically, in the radar of the related art, the receiver uses an IQ demodulator for signal demodulation but the transmitter does not use a IQ modulator. The disclosure, which shares the transmitter, uses the IQ modulator to generate the radar signal (generate a multi-tone signal). Thus, the receiver may achieve the distance sensing, and an economic system may be implemented by sharing the transmitter which uses most of power such as the power amplifier.

Figures 1, 7A:
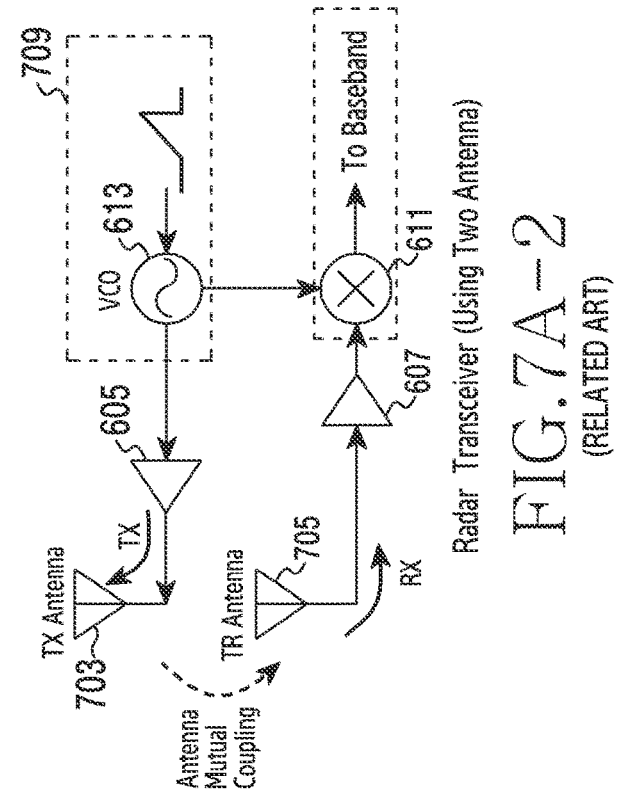
Figures 2, 7A:
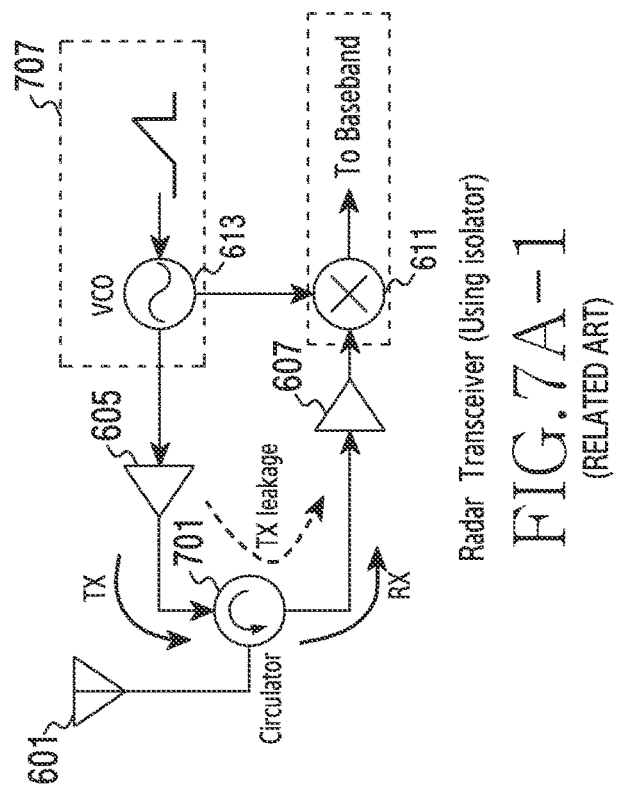
Figure 7B:
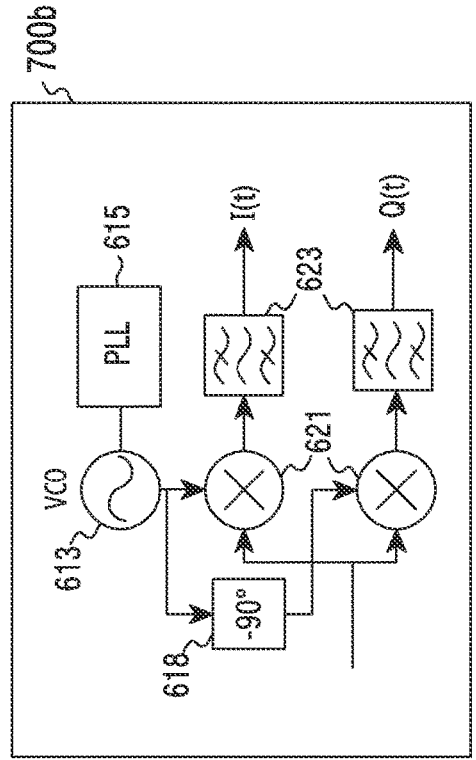
FIG. 7B illustrates the radar receiver structure according to an embodiment of the disclosure.

FIGS. 7A-1, 7A-2, and 7B illustrate a radar receiver structure according to various embodiments of the disclosure. FIG. 7A-1 illustrates a radar structure 700a-1 with a single antenna of the related art, FIG. 7A-2 illustrates a radar structure 700a-2 including a plurality of antennas of the related art, and FIG. 7B illustrates modifications of FIGS. 7A-1 and 7A-2 using an IQ modulator.

Referring to FIG. 7A-1, the radar structure of the related art with the single antenna may include an antenna 601, a power amplifier 605, a low noise amplifier 607, a VCO 613, a mixer 611, and/or a circulator 701. The circulator 701 is a passive element for fixing an RF signa flow in one direction.

In FIG. 7A-1, a transmitter 707 may use an FMCW signal generator, without using an IQ modulator. A signal generated by the FMCW signal generator may pass through the power amplifier 605 and the circulator 701 and be transmitted via the antenna 601. Reversely, a signal received at the antenna 601 may pass through the circulator 701 and the low noise amplifier 607 and be converted by the mixer 611 to generate a baseband signal.

Referring to FIG. 7A-2, the radar structure according to the related art with the plurality of the antennas may include a transmit antenna 703, a receive antenna 705, a power amplifier 605, a low noise amplifier 607, a VCO 613, and/or a mixer 611. Since the plurality of the antennas is used, the circulator 701 is not included unlike FIG. 7A-1.

In FIG. 7A-2, a transmitter 709 may use an FMCW signal generator, without using an IQ modulator. A signal generated by the FMCW signal generator may pass through the power amplifier 605 and be transmitted via the transmit antenna 703. Reversely, a signal received at the receive antenna 705 may pass through the low noise amplifier 607 and be converted by the mixer 611 to generate a baseband signal.

The transmit antenna 703 and the receive antenna 705 may have antenna mutual coupling.

Referring to FIG. 7B, part of a communication device 700b including the IQ modulator may replace the mixer 611 of FIGS. 7A-1 and 7A-2.

The communication device 700b including the IQ modulator may include a VCO 613, a PPL 615, a phase shifter 618, a mixer 621, and/or a filter 623. Since the radar receiver generally uses the direct conversion through this structure, the IQ modulator may replace it using the I signal and the Q signal. Specifically, a radar direction may be obtained using the direct conversion at the CW radar, and a method using the IQ modulator is adopted.

Figure 8A:
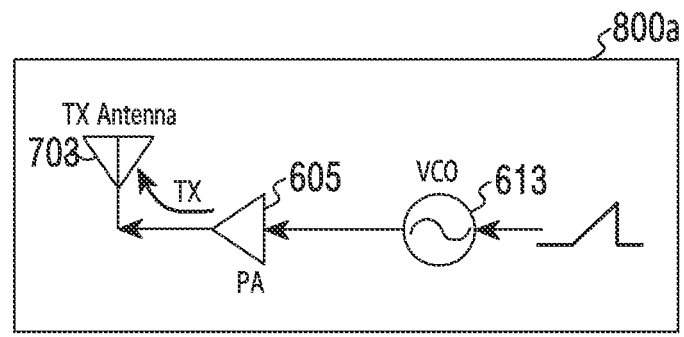
FIG. 8A illustrates a radar transmitter structure according to an embodiment of the disclosure.
Figure 8B:
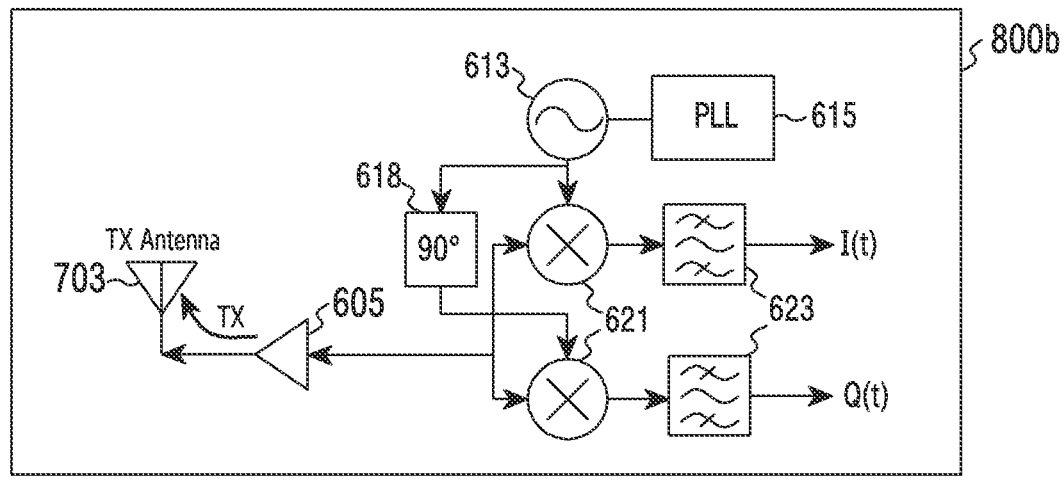
FIG. 8B illustrates the radar transmitter structure according to an embodiment of the disclosure.

FIGS. 8A and 8B illustrate a radar transmitter structure. FIG. 8A illustrates a radar transmitter 800a using an FMCW signal generator of the related art. FIG. 8B illustrates a radar transmitter 800b for integrating sensing and communication by use of an IQ modulator according to an embodiment of the disclosure.

Referring to FIG. 8A, the radar transmitter 800a using the FMCW signal generator may include a transmit antenna 703, a power amplifier 605, and/or a VCO 613. The general radar transmitter structure of FIG. 8A may acquire a high bandwidth and improve resolution for distance measurement using a broadband signal.

Referring to FIG. 8B, the radar transmitter 800b for integrating the sensing and the communication using the IQ modulator may include a transmit antenna 703, a power amplifier 605, a VCO 613, a PLL 615, a phase shifter 618, a mixer 621, and a filter 623.

As shown in FIGS. 5A and 5B, the structure of FIG. 8B may divide the sensing period and the radar period according to the time domain. If the IQ modulator is used, I(t) and Q(t) may be information signals in the communication period as shown in FIG. 5A, the CW signal may be generated in the sensing period as shown in FIG. 5B, and the distance may be measured by generating a CW signal having an intended IF.

Through the structure illustrated in FIG. 8B, an angle and a velocity of an object may be measured by generating a signal having one frequency. In contrast, through the structure of FIG. 8B, a plurality of CW signals having different frequencies needs to be generated to measure the distance of the object. The IQ modulator shown in FIGS. 8A and 8B may generate the CW signal having one frequency and the CW signals having different frequencies, and thus measure the angle, the velocity, and/or the distance as the radar.

Figure 9:
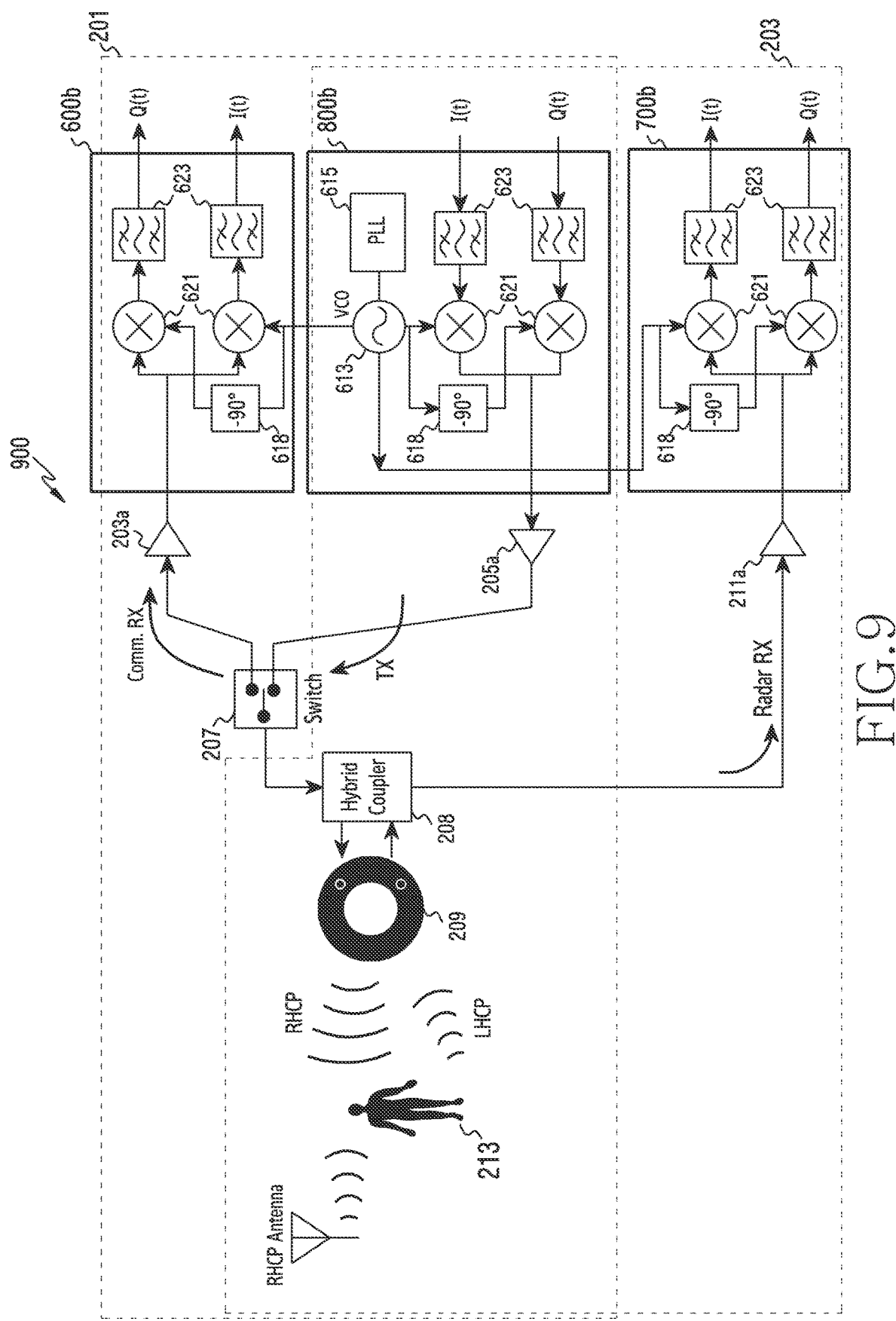
FIG. 9 illustrates a communication 900 which integrates communication and sensing using polarization and an IQ modulator according to an embodiment of the disclosure.

FIG. 9 illustrates a communication device which integrates communication and sensing using polarization and an IQ modulator according to an embodiment of the disclosure. FIG. 9 illustrates a single antenna by way of example, but the disclosure is not limited thereto.

Referring to FIG. 9, the communication device 900 may include a communication block 201 and/or a radar block 203. The communication block 201 and the radar block 203 may share a transmitter 800b using an IQ modulator. The transmitter 800b is shown in FIG. 8B.

According to an embodiment of the disclosure, the communication block 201 includes the receiver 600b of FIG. 6B. The receiver 600b is described in detail in FIGS. 6A-1, 6A-2, and 6B.

According to an embodiment of the disclosure, the radar block 203 includes the receiver 700b of FIG. 7B. The receiver 700b is described in detail in FIG. 7B.

Referring to FIG. 9, the communication device 900 may include a hybrid coupler 208 for using polarization, as shown in FIG. 2.

An output unit of the hybrid coupler 208 may be connected to antenna(s) 209. An input unit of the hybrid coupler 208 may be connected to an SPDT switch 207 and/or a low noise amplifier 211a. By means of the hybrid coupler 208, if a signal having first polarization is transmitted in the communication, the signal may be transmitted again by the antenna having the first polarization and thus the communication may be performed. In the sensing (the radar), if a signal having the first polarization is transmitted, the signal may be reflected by an object 213 and received with second polarization having the opposite phase to the first polarization. Hence, by dividing the signal polarization by means of the hybrid coupler, the communication may receive the signal by the receiver 600b and the sensing may receive the signal by the receiver 700b.

The SPDT switch 207 may be connected to the receiver 600b via the low nose amplifier 203a. In addition, the SPDT switch 207 may be connected to the transmitter 800b via the power amplifier 205a.

The receiver 700b may be connected to the hybrid coupler 207 via the low noise amplifier 2111a.

The first polarization may be RHCP or LHCP. If the first polarization is the RHCP, then the second polarization may be the LHCP. If the first polarization is the LHCP, then the second polarization may be the RHCP.

The hybrid coupler 207 may be a 90° hybrid coupler.

Figure 10:
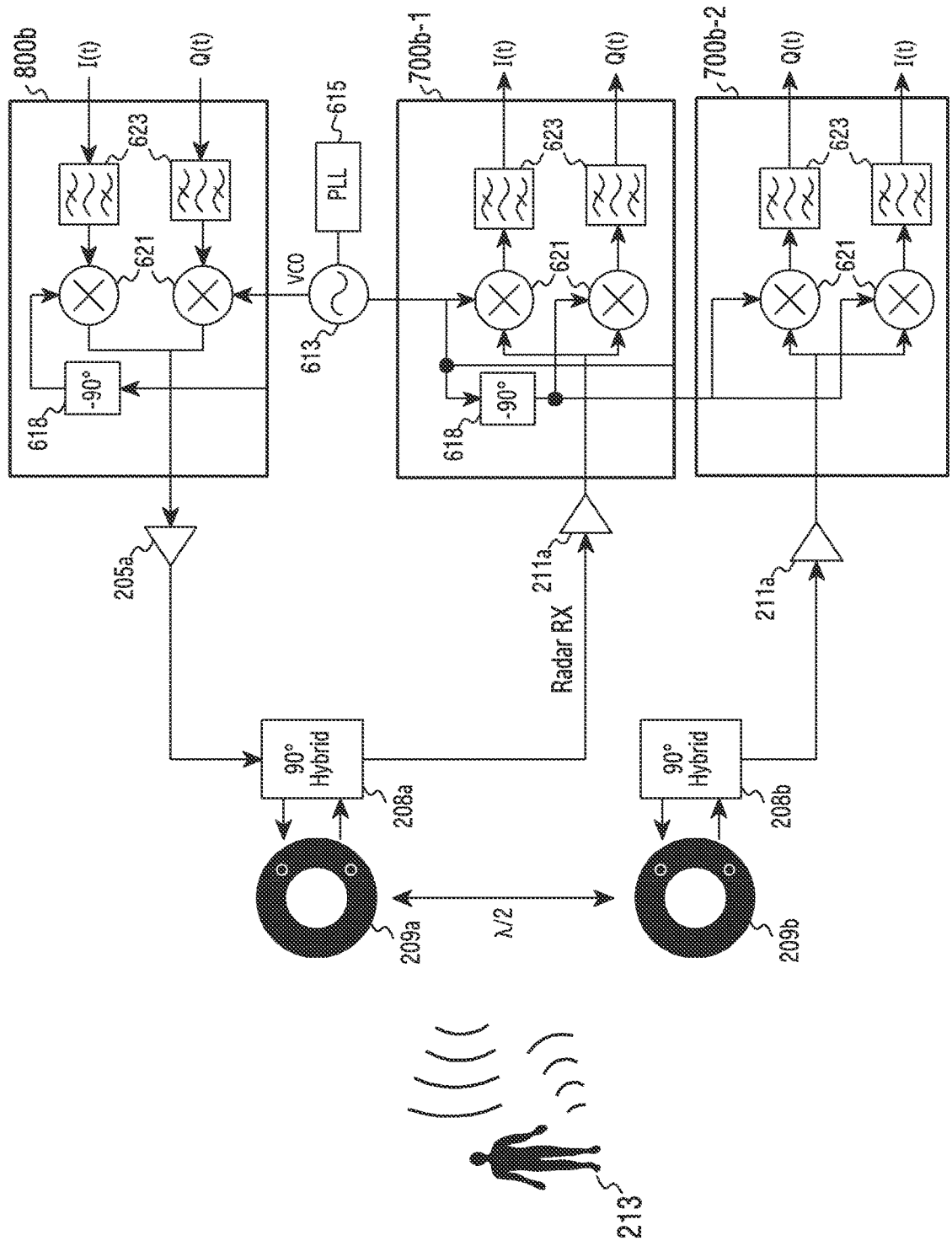
FIG. 10 illustrates a communication device 1000 for integrating communication and sensing including a plurality of antennas according to an embodiment of the disclosure.

FIG. 10 illustrates a communication device for integrating communication and sensing including a plurality of antennas according to an embodiment of the disclosure. FIG. 10 illustrates only the radar block by way of example, without the communication block of FIG. 9, but the disclosure is not limited thereto.

Referring to FIG. 10, the communication device 1000 includes an antenna 209a and an antenna 209b which are spaced away by a half wavelength, a first hybrid coupler 208a, and a second hybrid coupler 208b. The radar requires the plurality of the antennas 209a and 209b to detect a direction and an angle of arrival of an object 213, and the communication device 1000 may detect the direction of the object 213.

A transmitter 800b may be shared by the communication block (not shown) and the radar block (see FIG. 10). The transmitter 800b may be connected to the first hybrid coupler 205 via a power amplifier 205a.

The first hybrid coupler 205a may be connected to a receiver 700b-1 via a low noise amplifier 211a. The receiver 700b-1 may be configured identically to the receiver 700b of FIG. 7B.

A receiver 700b-2 may be connected to the hybrid coupler 208b via the low noise amplifier 211a. The receiver 700b-2 may be configured identically to the receiver 700b of FIG. 7B.

The first hybrid coupler 208a may be connected to the first antenna 209a, and the second hybrid coupler 208b may be connected to the second antenna 209b.

The first antenna 209a and the second antenna 209b may be spaced away by the half wavelength.

The first antenna 209a and the second antenna 209b may be dual-polarized antennas.

Figure 11A:
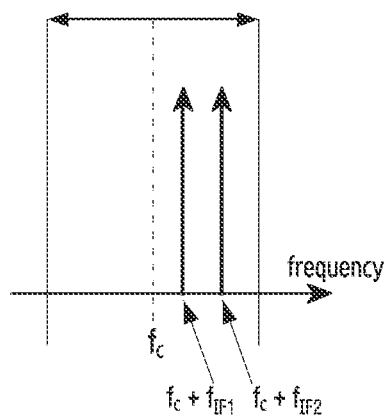
FIG. 11A illustrates a method for detecting a distance and a direction using radar according to an embodiment of the disclosure.
Figure 11B:
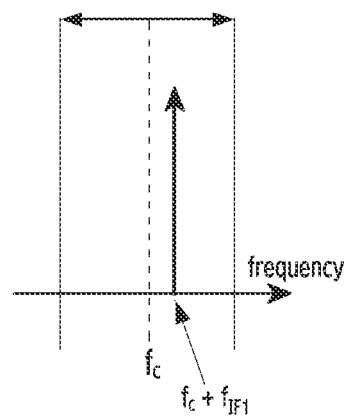
FIG. 11B illustrates the method for detecting the distance and the direction using the radar according to an embodiment of the disclosure.

FIGS. 11A and 11B illustrate a method for detecting a distance and a direction using radar according to various embodiments of the disclosure.

Referring to FIG. 11A, the distance measurement to an object using the radar is shown. Multi-tone radar is required to measure the distance, and it is necessary to generate signals having different IFs IF1 and IF2. Hence, the distance to the object is inversely proportional to a frequency difference $F_{IF1}-F_{IF2}$, and the distance may be calculated using the frequency difference $F_{IF1}-F_{IF2}$ of the signal generated by the transmitter 800b of FIGS. 8A and 8B. In general, the frequency difference $F_{IF1}-F_{IF2}$ is inversely proportional to the distance, and higher resolution may be achieved as the frequency difference $F_{IF1}-F_{IF2}$ increases. Typically, the frequency difference may range from 5 MHz to 10 MHz.

Referring to FIG. 11B the direction measurement of the object (the angle of arrival) using the radar is shown. One frequency signal may measure the direction (the angle of arrival) using the radar. Yet, a plurality of antennas spaced apart may be required. The signal $F_{IF1}$ generated by the transmitter 800b of FIGS. 8A and 8B to measure the direction generates a frequency which is greater than a Doppler frequency range and may separate the Doppler frequency in Fourier conversion (e.g., several kHz in general).

Figure 12:
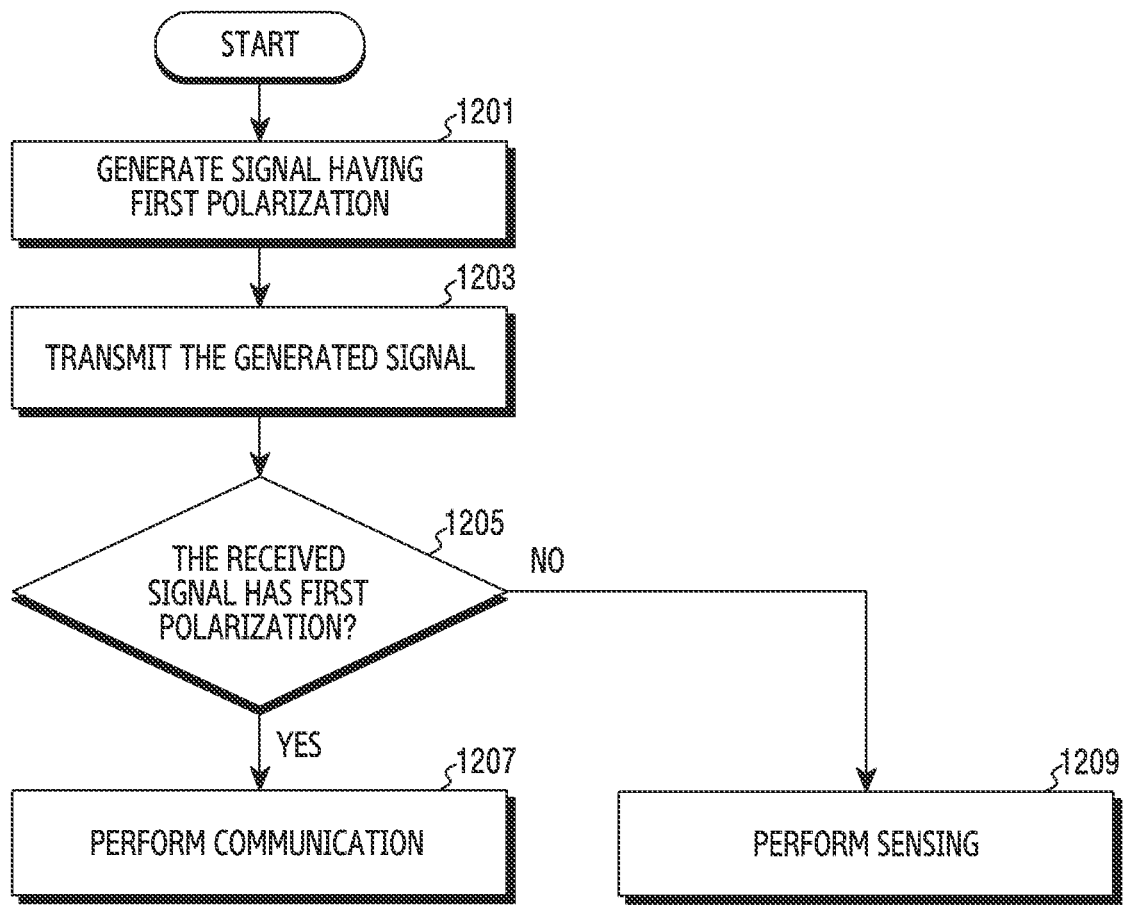
FIG. 12 illustrates an operating method of a communication device according to an embodiment of the disclosure.

FIG. 12 illustrates an operating method of a communication device according to an embodiment of the disclosure.

Referring to FIG. 12, the communication device 200, 900, or 1000 may generate a signal having first polarization in operation 1201. The signal having the first polarization may be generated by the IQ modulator in the common transmit chain 205 of the communication device 200, 900, or 1000.

The communication device 200, 900, or 1000 may transmit the signal having the first polarization in operation 1203. Specifically, the signal generated by the IQ modulator in the common transmit chain 205 may be transmitted via the hybrid coupler 208.

The communication device 200, 900, and 1000 may determine whether a receive signal has the first polarization in operation 1205. The receive signal may be a received signal in response to the signal having the first polarization. If the signal is received for the communication, the receive signal having the same polarization as the transmit signal having the first polarization may be received. By contrast, for the sensing, the receive signal corresponding to the transmit signal may be a signal having second polarization which is different from the first polarization.

The first polarization may be RHCP or LHCP. If the first polarization is the RHCP, the second polarization may be the LHCP. If the first polarization is the LHCP, the second polarization may be the RHCP.

If the receive signal has the first polarization in operation 1205, the communication device 200, 900, or 1000 may perform the communication through the receive signal in operation 1207.

If the receive signal has the second polarization (rather than the first polarization) in operation 1205, the communication device 200, 900, or 1000 may perform the sensing through the receive signal in operation 1209. The communication device 200, 900, and 1000 may observe (sense) the distance, the movement, the velocity, and the like of the object.

According to the operating method of FIG. 12, the communication device 200, 900, or 1000 may integrate the communication and the radar therein by separating the communication and the sensing (e.g., the radar).

According to an embodiment of the disclosure, a communication device of a wireless communication system may include a communication unit for bi-directional communication, and a radar unit for sensing. The communication unit and the radar unit commonly may include a common transmit chain which generates a transmit signal by a first IQ modulator. The common transmit chain may pass through a hybrid coupler and generate and transmit a transmit signal having first polarization. The communication unit may include a communication receive chain. If a receive signal has the first polarization in response to the transmit signal, the communication receive chain may receive the receive signal having the first polarization via the hybrid coupler and perform communication by the communication unit, and if the receive signal corresponding to the transmit signal has second polarization different from the first polarization, the radar unit may include a sensing receive chain, and the sensing receive chain may receive the receive signal having the second polarization via the hybrid coupler and perform sensing by the radar unit.

According to an embodiment of the disclosure, the signal having the first polarization may be orthogonal to the signal having the second polarization.

According to an embodiment of the disclosure, the first polarization may be RHCP or LHCP. If the first polarization is the RHCP, then the second polarization may be the LHCP, and if the first polarization is the LHCP, then the second polarization may be the RHCP.

According to an embodiment of the disclosure, the transmit signal may be divided into a communication period and a sensing period based on time, the common transmit chain may include a first IQ modulator, and in the sensing period, the first IQ modulator may generate a CW signal having a first frequency.

According to an embodiment of the disclosure, the transmit signal may further include a signal having a second frequency which is different from the first frequency, by the first IQ modulator.

According to an embodiment of the disclosure, the communication receive chain may include a second IQ modulator, and the sensing receive chain may include a third IQ modulator.

According to an embodiment of the disclosure, the hybrid coupler may be a 90° hybrid coupler.

According to an embodiment of the disclosure, the communication transmit chain may include a VCO, a phase locked loop, and a power amplifier (PA) for transmission.

According to an embodiment of the disclosure, the communication receive chain and the sensing receive chain may include a low noise amplifier (LNA).

According to an embodiment of the disclosure, the VCO may be connected to the first IQ modulator, the second IQ modulator and the third IQ modulator.

According to an embodiment of the disclosure, an operating method of a communication device of a wireless communication system, a communication unit and a radar unit commonly including a common transmit chain, may include generating and transmitting, at the common transmit chain, a transmit signal having first polarization via a hybrid coupler, wherein if a receive signal corresponding to the transmit signal has the first polarization, the communication unit receives the receive signal having the first polarization via the hybrid coupler and performs communication, and if the receive signal corresponding to the transmit signal has second polarization different from the first polarization, the radar unit receives the receive signal having the second polarization via the hybrid coupler and performs sensing, the communication unit is for bi-directional communication, the radar unit is for the sensing, and the common transmit chain is commonly used in the communication unit and the radar unit.

According to an embodiment of the disclosure, the signal having the first polarization may be orthogonal to the signal having the second polarization.

According to an embodiment of the disclosure, the transmit signal may be divided into a communication period and a sensing period, the common transmit chain may include a first IQ modulator, and in the sensing period, the first IQ modulator may generate a CW signal having a first frequency.

According to an embodiment of the disclosure, the transmit signal may further include a signal having a second frequency different from the first frequency, generated by the first IQ modulator.

According to an embodiment of the disclosure, the communication unit may include a communication receive chain, the radar unit may include a sensing receive chain, the communication receive chain may include a second IQ modulator, and the sensing receive chain may include a third IQ modulator.

According to an embodiment of the disclosure, the hybrid coupler may be a 90° hybrid coupler.

According to an embodiment of the disclosure, the common transmit chain may include a VCO, a phase locked loop, and a PA for transmission.

According to an embodiment of the disclosure, the communication receive chain and the sensing receive chain may include an LNA.

According to an embodiment of the disclosure, the VCO may be connected to the first IQ modulator, the second IQ modulator and the third IQ modulator.

An apparatus and a method according to various embodiments of the disclosure may implement a communication device which integrates communication and sensing functions, using an in-phase quadrature (IQ) modulator and polarization.

Effects obtainable from the disclosure are not limited to the above-mentioned effects, and other effects which are not mentioned may be clearly understood by those skilled in the art of the disclosure through the following descriptions.

The methods according to the embodiments described in the claims or the specification of the disclosure may be implemented in software, hardware, or a combination of hardware and software.

As for the software implementation, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (e.g., software module or software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. Also, a plurality of memories may be included.

In addition, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A communication device in a wireless communication system, comprising:
    a communication unit, implemented by a hardware, configured for bi-directional communication; and
    a radar unit, implemented by a hardware, configured to sense an object,
    wherein the communication unit and the radar unit commonly include:
    a common transmit chain configured to generate a transmit signal by a first in-phase quadrature (IQ) modulator,
    wherein the common transmit chain passes through a hybrid coupler and is configured to generate and transmit a transmit signal having first polarization,
    wherein the communication unit comprises:
        a communication receive chain, wherein if a receive signal has the first polarization in response to the transmit signal, the communication receive chain receives the receive signal having the first polarization via the hybrid coupler and performs communication by the communication unit,
    wherein, the radar unit comprises:
        a sensing receive chain, and
    wherein, in case that the receive signal corresponding to the transmit signal has second polarization different from the first polarization, the sensing receive chain receives the receive signal having the second polarization via the hybrid coupler and senses the object by the radar unit.

2. The communication device of claim 1, wherein the signal having the first polarization is orthogonal to the signal having the second polarization.

3. The communication device of claim 1,
    wherein the first polarization is one of right handed circular polarization (RHCP) or left handed circular polarization (LHCP),
    wherein, in case that the first polarization is the RHCP, the second polarization is the LHCP, and
    wherein, in case that the first polarization is the LHCP, the second polarization is the RHCP.

4. The communication device of claim 1,
    wherein the transmit signal is divided into a communication period and a sensing period based on time,
    wherein the common transmit chain comprises a first IQ modulator, and
    wherein, in the sensing period, the first IQ modulator generates a continuous wave (CW) signal having a first frequency.

5. The communication device of claim 4, wherein the first IQ modulator is configured to generate the transmit signal including a signal having a second frequency which is different from the first frequency.

6. The communication device of claim 4,
    wherein the communication receive chain comprises a second IQ modulator, and
    wherein the sensing receive chain comprises a third IQ modulator.

7. The communication device of claim 1, wherein the hybrid coupler is a 90° hybrid coupler.

8. The communication device of claim 1, wherein the common transmit chain comprises:
    a voltage controlled oscillator (VCO);
    a phase locked loop; and
    a power amplifier (PA) for transmission.

9. The communication device of claim 5, wherein each of the communication receive chain and the sensing receive chain comprises a low noise amplifier (LNA).

10. The communication device of claim 8, wherein the VCO is connected to a first IQ modulator included in the common transmit chain, a second IQ modulator included in the communication receive chain and a third IQ modulator included in the sensing receive chain.

11. A method performed by a communication device in a wireless communication system, a communication unit implemented by a hardware and a radar unit implemented by a hardware commonly comprising a common transmit chain, the method comprising:
    generating and transmitting, at the common transmit chain, a transmit signal having first polarization via a hybrid coupler,
    receiving, in case that a receive signal corresponding to the transmit signal has the first polarization, by the communication unit, the receive signal having the first polarization via the hybrid coupler and communicating based on the receive signal,
    in case that the receive signal corresponding to the transmit signal has second polarization different from the first polarization, receiving, at the radar unit, the receive signal having the second polarization via the hybrid coupler and performing sensing,
    wherein the communication unit is configured for bi-directional communication,
    wherein the radar unit is configured to perform sensing of an object, and
    wherein the common transmit chain is commonly used by the communication unit and the radar unit.

12. The method of claim 11, wherein the signal having the first polarization is orthogonal to the signal having the second polarization.

13. The method of claim 11,
    wherein the first polarization is one of right handed circular polarization (RHCP) or left handed circular polarization (LHCP),
    wherein, in case that the first polarization is the RHCP, the second polarization is the LHCP, and
    wherein, in case that the first polarization is the LHCP, the second polarization is the RHCP.

14. The method of claim 11,
    wherein the transmit signal is divided into a communication period and a sensing period,
    wherein the common transmit chain comprises a first IQ modulator, and
    wherein, in the sensing period, the first IQ modulator generates a continuous wave (CW) signal having a first frequency.

15. The method of claim 14, wherein the first IQ modulator generates a transmit signal having a second frequency different from the first frequency.

16. The method of claim 14,
    wherein the communication unit comprises a communication receive chain,
    wherein the radar unit comprises a sensing receive chain, wherein the communication receive chain comprises a second IQ modulator, and wherein the sensing receive chain comprises a third IQ modulator.

17. The method of claim 11, wherein the hybrid coupler is a 90° hybrid coupler.

18. The method of claim 11, wherein the common transmit chain comprises:

a voltage controlled oscillator (VCO);
a phase locked loop; and
a power amplifier (PA) for transmission.

19. The method of claim 16, wherein each of the communication receive chain and the sensing receive chain comprises a low noise amplifier (LNA).

20. The method of claim 18, wherein the VCO is connected to a first IQ modulator included in the common transmit chain, a second IQ modulator included in a communication receive chain of the communication unit and a third IQ modulator included in a sensing receive chain of the radar unit.

* * * * *